360-44
5/2/87 DR RE 32,432

United States Patent [19]

Tanaka et al.

[11] E Patent Number: Re. 32,432

[45] Reissued Date of Patent: Jun. 2, 1987

[54] METHOD AND APPARATUS FOR DECODING DIGITAL DATA

[75] Inventors: Masato Tanaka; Shunsuke Furukawa, both of Tokyo, Japan

[73] Assignee: Sony Corporation, Tokyo, Japan

[21] Appl. No.: 729,880

[22] Filed: May 2, 1985

Related U.S. Patent Documents

Reissue of:

[64] Patent No.: 4,428,007
Issued: Jan. 24, 1984
Appl. No.: 399,244
Filed: Jul. 19, 1982

U.S. Applications:

[62] Division of Ser. No. 222,278, Jan. 2, 1981.

[30] Foreign Application Priority Data

Dec. 28, 1979 [JP] Japan ..... 54-172532
Jan. 17, 1980 [JP] Japan ..... 55-3929

[51] Int. Cl.[4] ..... G11B 5/09
[52] U.S. Cl. ..... 360/44; 375/22
[58] Field of Search ..... 360/44, 51; 375/22; 329/106

[56] References Cited

U.S. PATENT DOCUMENTS 3,959,816 5/1976 Spiecens ..... 360/44
4,320,525 3/1982 Woodward ..... 360/44

*Primary Examiner*—Vincent P. Canney
*Attorney, Agent, or Firm*—Lewis H. Eslinger; Alvin Sinderbrand

[57] ABSTRACT

Digital data formed of binary bits of first and second values occupying consecutive bit cells of predetermined intervals are encoded such that successive binary bits of the first or second values are represented by predetermined separations between succeeding transitions. A first transition is produced at a first reference point in a bit cell when a binary bit of the second value changes over to a binary bit of the first value. When successive binary bits of the first value are sensed, a respective second transition is produced at a second reference point in a bit cell after sensing every 2 or 3 binary bits of the first value. When successive binary bits of the second value are sensed, a respective second transition is produced at the second reference point in a bit cell when at least two successive binary bits of the first value are followed by a binary bit of the second value and also after sensing every 3 or 4 successive binary bits of the second value, such that the last-mentioned second transition at the second reference point is separated from the closest first transition thereto by at least 1.5 bit cell intervals but no more than 4.5 bit cell intervals and successive ones of the second transitions are separated from each other by no more than 4 bit cell intervals.

12 Claims, 64 Drawing Figures

0 1 0
T
0 0 0 1 0 0

0 1 1 0
1.5T 0 1 1 1 0
2.5 T 0 1 1 1 1 0
1.5T 2T 0 1 1 1 1 1 0
1.5T 3T 0 1 1 1 1 1 1 0
1.5T 2T 2T 0 1 1 1 1 1 1 1 0
1.5T 2T 3T 0 1 1 1 1 1 1 1 1 0
1.5T 2T 2T 2T 0 1 1 1 1 1 1 1 1 1 0
1.5T 2T 2T 3T 0 1 1 1 1 1 1 1 1 1 1 0
1.5T 2T 2T 2T 2T 0 1 1 1 1 1 1 1 1 1 1 1 0
1.5T 2T 2T 2T 3T 1 1 0 1
0 0 0 1 0 0 1 0 0
1.5T 1 1 0 0 1
2.5T 1 1 0 0 0 1
3.5T 1 1 0 0 0 0 1
4.5T 1 1 0 0 0 0 0 1
4T
1.5T 1 1 0 0 0 0 0 0 1
4T
2.5T 1 1 0 0 0 0 0 0 0 1
4T
3.5T 1 1 0 0 0 0 0 0 0 0 1
4T
4.5T 1 1 0 0 0 0 0 0 0 0 0 1
4T
4T
1.5T

FIG. 4
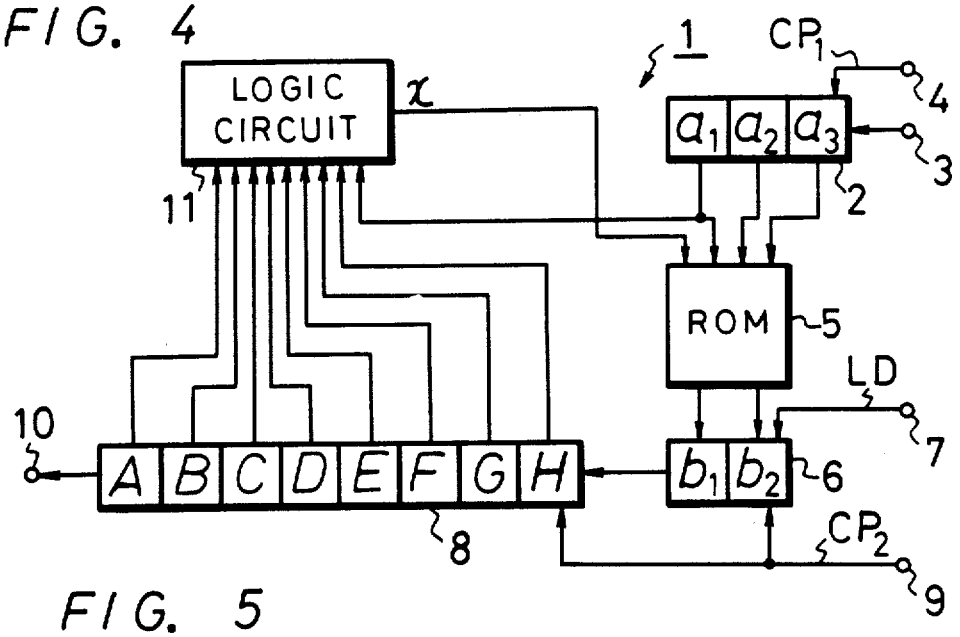
FIG. 5
| ADDRESS | | | | OUTPUT | |
|---|---|---|---|---|---|
| $x_1$ | $a_1$ | $a_2$ | $a_3$ | $b_1$ | $b_2$ |
| 0 | 0 | 0 | 0 | 0 | 0 |
| 0 | 0 | 0 | 1 | 0 | 0 |
| 0 | 0 | 1 | 0 | 0 | 1 |
| 0 | 0 | 1 | 1 | 0 | 1 |
| 0 | 1 | 0 | 0 | 1 | 0 |
| 0 | 1 | 0 | 1 | 1 | 0 |
| 0 | 1 | 1 | 0 | 0 | 0 |
| 0 | 1 | 1 | 1 | 1 | 0 |
| 1 | 0 | 0 | 0 | 1 | 0 |
| 1 | 0 | 0 | 1 | 1 | 0 |
| 1 | 0 | 1 | 0 | 0 | 1 |
| 1 | 0 | 1 | 1 | 0 | 1 |
| 1 | 1 | 0 | 0 | 0 | 0 |
| 1 | 1 | 0 | 1 | 0 | 0 |
| 1 | 1 | 1 | 0 | 0 | 0 |
| 1 | 1 | 1 | 1 | 0 | 0 |
FIG. 6A
FIG. 6B
FIG. 6C
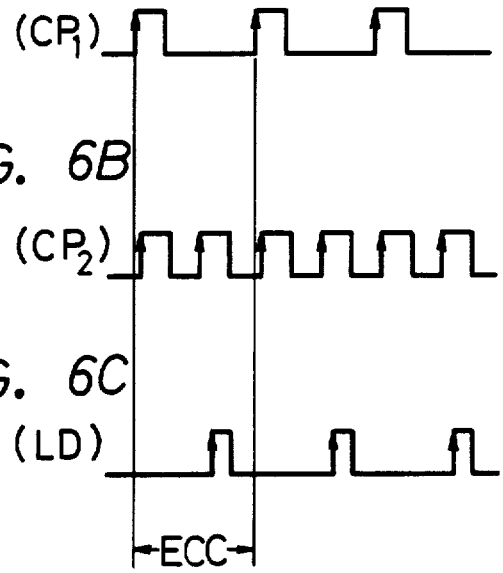

0 1 0
T
0 0 0 1 0 0

0 1 1 0
1.5T 0 1 1 1 0
2.5T 0 1 1 1 1 0
1.5T 2T 0 1 1 1 1 1 0
2.5T 2T 0 1 1 1 1 1 1 0
1.5T 2T 2T 0 1 1 1 1 1 1 1 0
1.5T 3T 2T 0 1 1 1 1 1 1 1 1 0
1.5T 2T 2T 2T 0 1 1 1 1 1 1 1 1 1 0
1.5T 2T 3T 2T 0 1 1 1 1 1 1 1 1 1 1 0
1.5T 2T 2T 2T 2T 0 1 1 1 1 1 1 1 1 1 1 1 0
1.5T 2T 2T 3T 2T 0 1 0 1
2T 1 1 0 1
1.5T 0 1 0 0 1
3T 1 1 0 0 1
2.5T 1 0 0 0 1
4T 1 0 0 0 0 1
3.5T 1.5T 1 0 0 0 0 0 1
3.5T 2.5T 1 0 0 0 0 0 0 1
3.5T 3.5T 1 0 0 0 0 0 0 0 1
3.5T 3T 1.5T 1 0 0 0 0 0 0 0 0 1
3.5T 3T 2.5T 1 0 0 0 0 0 0 0 0 0 1
3.5T 3T 3.5T 1 0 0 0 0 0 0 0 0 0 0 1
3.5T 3T 3T 1.5T 1 0 0 0 0 0 0 0 0 0 0 0 1
3.5T 3T 3T 2.5T

METHOD AND APPARATUS FOR DECODING DIGITAL DATA

Matter enclosed in heavy brackets [ ] appears in the original patent but forms no part of this reissue specification; matter printed in italics indicates the additions made by reissue.

This *application* is *for a reissue of U.S. Pat. No. 4,428,007 granted Jan. 24, 1984, on application Ser. No. 06/399,244, filed July 19, 1982, which was* a [continuation] *division* of application Ser. No. 222,278, filed Jan. 2, 1981.

BACKGROUND OF THE INVENTION

This invention relates to digital data encoding/decoding techniques and, more particularly, to such encoding and decoding techniques wherein successive binary bits of first or second values are represented by the separation between succeeding transitions, these transitions having predetermined minimum and maximum separations. The encoded data is particularly applicable for direct recording on a record medium, such as a magnetic tape, a rotary disc, and the like.

Record media and different types of data transmission channels exhibit characteristics such that so-called raw digital data is not easily recorded/reproduced or transmitted/received with sufficient fidelity. To avoid distortion and loss of information, various encoding techniques have been proposed whereby the usual binary "1"s and "0"s are converted to suitably coded form which is more accurately recorded or transmitted. One example of such an encoding technique converts an m-bit data word, formed of m binary bits, into a n-bit data word, as disclosed in copending application Ser. No. 201,781. Another encoding technique is known as a "three position modulation" encoder, whereby digital data is encoded in a so-called look-ahead code by which the density of the recorded data is increased.

In the three position modulation encoder, succeeding binary "1"s are separated from each other by at least two binary "0"s. By reason of this separation, the minimum interval between succeeding transitions is equal to three bit cell intervals, wherein a bit cell is an interval, or duration, occupied by a binary bit. That is, if a binary "1" is represented by, for example, a signal voltage that is greater than the signal voltage representing a binary "0", the transitions between "1"s and "0"s are separated by at least 3T, wherein T is equal to the bit cell interval. If the digital signal which is produced by the three position modulation encoding technique is further converted to, for example, NRZI form, then the minimum separation between succeeding transitions, referred to herein as the transition interval, $T_{min}$, and the maximum transition interval $T_{max}$, are set at $T_{min}=1.5T$ and $T_{max}=6T$.

When digital data is recorded on a magnetic medium, certain constraints must be placed upon the minimum transition interval $T_{min}$. That is, where a high recording data density is desired, the minimum transition interval $T_{min}$ must be of sufficient duration to avoid a possible misinterpretation of succeeding transitions that are spaced too closely to each other. That is, a transition that may be spaced too closely to another may be missed, or skipped, during a signal reproducing operation, thereby distorting the information which can be recovered. Although the minimum transition interval $T_{min}$ of the aforementioned three position modulation encoder is satisfactory, the maximum transition interval $T_{max}$ of that encoder is, in many applications, too long. For example, a maximum transition interval $T_{max}$ of 6T is not favorably disposed for self-clocking. Hence, the synchronous reproduction of data which has been encoded in three position modulation format may not be easily attained. Consequently, the reproduced data may be distorted, and valuable information may be lost.

OBJECTS OF THE INVENTION

Therefore, it is an object of the present invention to provide an improved data encoding technique which avoids the aforenoted disadvantages of the prior art.

Another object of this invention is to provide a data encoding technique which can be used to record digital information with relatively high density, which information can be readily reproduced by means of self-clocking arrangements.

A further object of this invention is to provide a data encoding technique which is a marked improvement over the aforementioned three position modulation technique.

An additional object of this invention is to provide a data encoding technique wherein successive binary bits are represented by succeeding transitions in the encoded digital signal, and wherein the minimum transition interval is on the order of about 1.5T and the maximum transition interval is on the order of about 4T or 4.5T.

Yet another object of this invention is to provide a data encoding technique which can be implemented by an encoder of relatively simple construction, and wherein the encoded data can be decoded by a compatible decoder also of simple construction.

A still further object of this invention is to provide an improved data encoding technique wherein the encoded data is readily adaptable for self-clocking.

Various other objects, advantages and features of the present invention will become readily apparent from the ensuing detailed description, and the novel features will be particularly pointed out in the appended claims.

SUMMARY OF THE INVENTION

In accordance with this invention, a data encoding technique is described, wherein an encoded digital signal is produced having transitions therein, the separation between succeeding transitions representing successive binary bits of first or second values. A first transition is produced at a first reference point in a bit cell when a binary bit of the second value changes over to a binary bit of the first value. When successive binary bits of the first value are present, a respective second transition is produced at a second reference point in a bit cell after sensing every 2 or 3 binary bits of the first value. When successive binary bits of the second value are present, a respective second transition is produced at the second reference point in a bit cell when at least two successive binary bits of the first value are followed by a binary bit of the second value and also after sensing every 3 or 4 successive binary bits of the second value, such that the last-mentioned second transition is separated from a first transition by at least 1.5 bit cell intervals but no more than 4.5 bit cell intervals and successive ones of these second transitions are separated from each other by no more than 4 bit cell intervals. In a preferred embodiment, when successive binary bits of the first value are present, a second transition is produced after every two of these bits. If the total number of successive bits is odd, then one of the second transitions is produced after three such bits and, thereafter, a second transition is produced after sensing each two successive bits. When the total number of successive bits of the second binary value is greater than 4, a second transition is produced, in one embodiment, after three such bits and, thereafter, after every four such bits. In another embodiment, the aforementioned second transition is produced after every 4 bits.

BRIEF DESCRIPTION OF THE DRAWINGS

The following detailed description, given by way of example, will best be understood in conjunction with the accompanying drawings in which:

FIG. 4 is a block diagram of one embodiment of the encoder in accordance with the present invention;

FIG. 5 is a table which is useful in understanding the operation of the encoder shown in FIG. 4;

FIGS. 6A–6C are timing diagrams which represent the various timing signals used in the encoder of FIG. 4;

DETAILED DESCRIPTION OF PREFERRED EMBODIMENTS

Figures 1A, 1B, 1C, 1D, 1E, 1F, 1G, 1H, 1I, 1J, 1K:
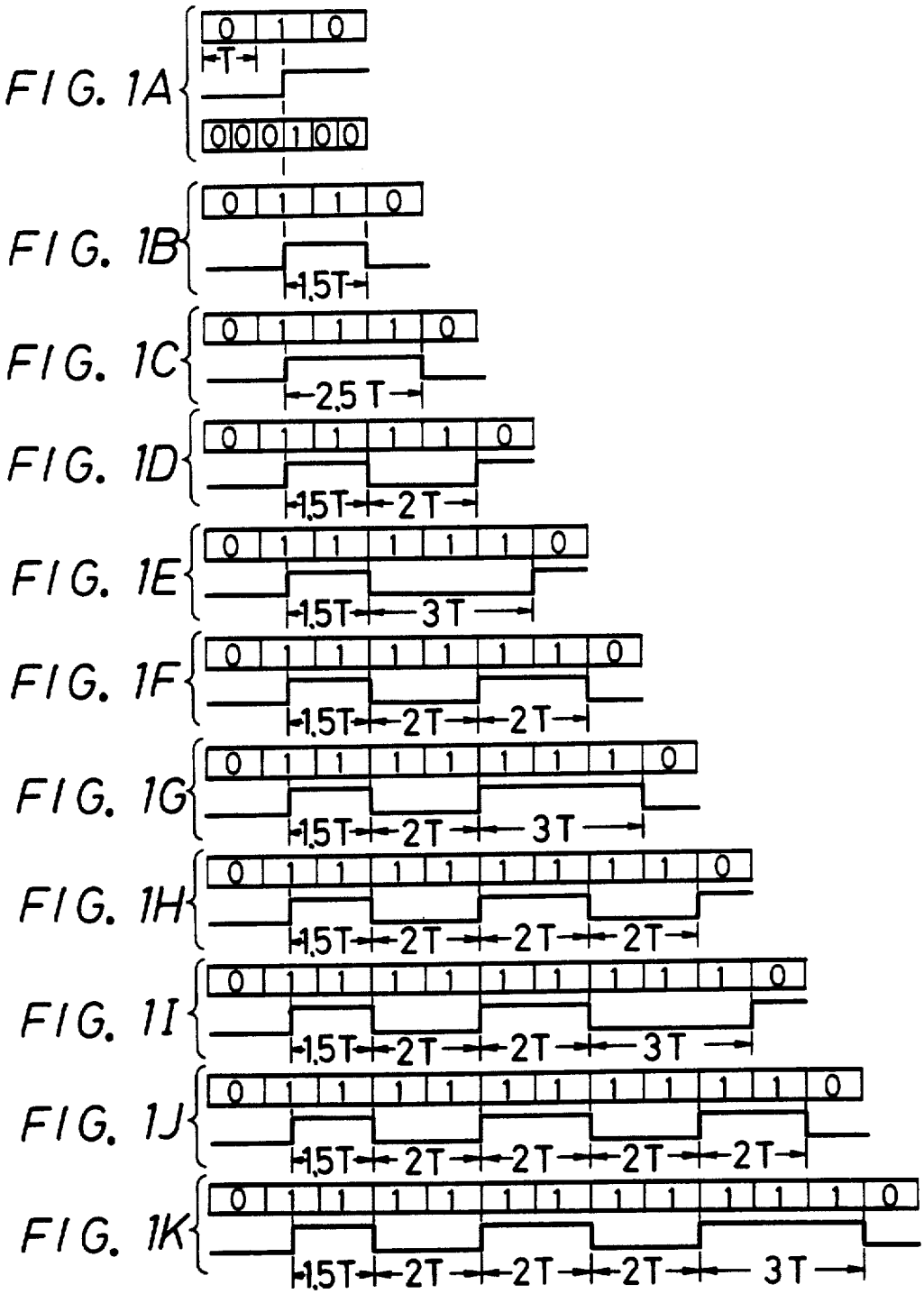
FIGS. 1A–1K, 2A–2H and 3A–3I are timing diagrams which are useful in understanding the encoding technique of the present invention.

Referring now to the drawings, FIGS. 1A–1K represent the encoding technique by which successive binary "1"s are encoded into the preferred format by which succeeding transitions in the encoded digital signal, that is, the digital signal produced by way of the present invention, represents successive binary "1"s. In each of these figures, an initial transition is produced when the input digital signal undergoes a change-over from a binary "0" to a binary "1". This transition is referred to herein as the "first transition" or "first-type" transition, and is produced in substantially the middle portion of a bit cell. As used herein, the expression "bit cell" refers to the interval or duration occupied by a binary bit of either "1" or "0" value.

When successive binary "1"s are encoded, after the first transition is produced at the middle portion of a bit cell, the next-following transition is produced at the trailing edge of a bit cell, that is, this next-following transition, which is referred to herein as the "second" or "second-type" transition, is produced at the boundary between adjacent bit cells. For the purpose of the present description, a "first" transition is produced at a first reference point, that is, at the middle portion of a bit cell, and a "second" transition is produced at a second reference point, that is, at the trailing edge of a bit cell. This location of the transitions in the encoded data is similar to that of the NRZI format. However, in the NRZI code, the minimum transition interval T that is produced in response to successive binary "1"s is equal to 1T, and the maximum transition interval that is produced in response to successive binary "0"s has no limitation. The present invention differs from these conditions of the NRZI code in that the minimum transition interval $T_{min}$ that is produced in response to successive binary "1"s is equal to 1.5T. (wherein T is equal to the bit cell interval), and the maximum transition interval $T_{max}$ is equal to 4.5T or even 4T in response to successive binary "0"s.

In the encoded data produced in response to the input digital signal [010] shown in FIG. 1A, only a single transition in the encoded signal is produced, this single transition coinciding with the middle portion of the bit cell which is occupied by the binary "1". The waveform produced by this encoded data is shown beneath the representation of [010], and a digitized version of this waveform is represented therebeneath. This digitized version of the waveform contains bits whose bit cells are equal to one-half the bit cell duration of the input digital data; and a transition in the encoded data waveform is represented by a binary "0" bit of one-half bit cell duration followed by a binary "1" bit of one-half bit cell duration. Although not shown herein, it may be appreciated that the transition in the waveform shown in FIG. 1A may be a negative transition, that is, the waveform may undergo a change from its relatively higher level to its lower level. Nevertheless, the digitized representation of such a transition is represented by digitized bits 01.

As shown in FIG. 1B, input digital data [0110] is encoded in a manner such that a first transition is produced in the middle of the bit cell containing the first binary "1", and a second transition is produced at the trailing edge of the bit cell containing the last binary "1", that is, this second transition is produced at the binary of the bit cells containing the binary signals 10. The separation between these first and second transitions is equal to 1.5T, wherein T is equal to the bit cell interval. It will be appreciated that a "first" transition is produced in the middle of a bit interval when the input digital data undergoes a changeover from a binary "0" value to a binary "1" value. A "second" transition is produced at the trailing edge of a bit cell interval in accordance with the following conditions: (a) a changeover from a binary "1" to a binary "0"; or (b) after a predetermined number of successive binary "1"s or "0" have been received, provided that succeeding transitions are separated by no less than $T_{min}=1.5T$. These conditions are not mutually exclusive and, as will be explained in greater detail below, a "second" transition is not produced in accordance with condition (a) if such a second transition would follow a "first" transition by less than a predetermined amount. In encoding the input digital data shown in FIG. 1B, the first and second transitions are separated by 1.5T, that is, by 1.5 bit cell intervals.

Referring to FIG. 1C, the input digital data [01110] is encoded such that a first transition is produced in the middle of the bit cell interval containing the first binary "1", and a second transition is produced at the trailing edge of the bit cell containing the last binary "1". Thus, the total separation between these transitions is seen to be equal to 2.5T. A binary "1" is not produced at the boundary separating the bit cells containing the second and third binary "1"s because this would result in separation between two transitions by an amount equal 1.0T. In the present invention, the predetermined minimum separation $T_{min}$ between succeeding transitions is equal 1.5T. Thus, the requirement of condition (b) above would prohibit the production, in encoding the data shown in FIG. 1C, of a transition between the second and third binary "1"s.

When the number of successive binary "1"s is greater than 3, a "second" transition is produced after every 2 or 3 successive "1"s, as will be described. Stated otherwise, a "first" transition is produced in the middle of the bit cell containing the first of the binary "1"s (that is, following the change-over from a binary "0" to a binary "1") and a second transition is produced after every n successive binary "1"s wherein n=2 or 3, provided that condition (b) above is satisfied. Thus, to encode the input digital signal [011110], the first transition is produced in the middle of the bit cell containing the first binary "1", and a respective second transition is produced after every 2 successive binary "1"s. Consequently, the first two transitions in the encoded data are separated by 1.5T, and the next two transitions are separated by 2T.

In FIG. 1E, the first transition is produced in the middle of the bit cell containing the first binary "1", and then a second transition is produced at the trailing edge of the bit cell containing the second binary "1". Then, the next "second" transition is produced following the next 3 binary "1"s. It is recognized that a "second" transition cannot be produced after every 2 binary "1"s to encode the data shown in FIG. 1E because this would result in a separation between the last two transitions by an amount equal to 1T.

From FIGS. 1F-1K, it is seen that if the total number of successive binary "1"s in the input digital data is an even number in excess of 3, then a respective transition is produced after every two successive binary "1"s. However, if the total number of successive binary "1"s is an odd number in excess of 3, then a transition is produced after every two successive binary "1"s, except that the last five binary "1"s are divided into two groups, the first group consisting of 2 binary "1"s and the second group consisting of 3 binary "1"s. Hence, if the total number of successive binary "1"s is an odd number in excess of 3, then two transitions will be separated from each other by a maximum of 3T. In FIGS. 1G, 1I and 1K, this maximum separation is provided between the last two transitions. If desired, this maximum separation can be provided between any other pair of transitions, such as between the second and third transitions, the third and fourth transitions, the fourth and fifth transitions, and the like. Of course, the separation between the first two transitions, as shown in FIGS. 1D-1K, is equal to $T_{min}=1.5T$.

As a modification of the example represented by FIGS. 1D-1K, a transition can be produced after every 3 successive binary "1"s. This would result in the encoded waveforms shown in FIGS. 1D-1G. However, if the input digital data is as shown in FIG. 1H, then, after the initial minimum separation of 1.5T between the first two transitions, as shown, the next transition would be produced after 3 binary "1"s, and then another transition would be produced after the next-following 3 binary "1"s. This would result in the usual minimum separation of 1.5T between the first two transitions, and then the remaining transitions would be separated by 3T. To encode the input digital data shown in FIG. 1I, the first two transitions would be separated by 1.5T, then the next-following transition would be separated by 3T, and then the remaining transitions would be separated by 2T. To encode the input digital data shown in FIG. 1J, the first two transitions would be separated by 1.5T, the next-following transitions would be separated by 3T, the next-following transition also would be separated by 3T, and then the final transition would be separated by 2T. To encode the input digital data shown in FIG. 1K, the first two transitions would be separated by 1.5T, and then all of the following transitions would be separated by 3T. Thus, where possible, a transition is produced after every 3 binary "1"s, provided that this does not result in a separation between succeeding transitions which is less than the minimum separation of 1.5T.

As yet another example, successive binary "1"s can be divided into groups of three "1"s and groups of two "1"s alternately. Hence, if the input digital data contains 9 successive binary "1"s, these successive bits may be divided into a group of 2, followed by another group of 2 bits, followed by a group of 3 bits, and then followed by a group of 2 bits, with a transition being produced at the trailing edge of each group. The encoded waveform thus will exhibit transitions which are separated by 1.5T, 2T, 3T and 2T, respectively. If the input digital data contains ten successive binary "1"s, these bits may be divided into a group of 2, followed by a group of 3, followed by a group of 2 and followed by a group of 3 such bits. The encoded waveform thus will be provided with transitions which are separated by 1.5T, 3T, 2T and 3T, respectively. Nevertheless, even in this modified example, the minimum separation between succeeding transitions is seen to be 1.5T.

The foregoing has described the encoding of input digital data wherein that data contains successive binary "1"s. FIGS. 2 and 3 represent the encoding of data which contains successive binary "0"s. FIGS. 2A-2H represent the encoding of input digital data in which successive binary "0"s are preceded by the combination 01. FIGS. 3A-3I represent the encoding of input digital data in which the successive binary "0"s are preceded by the combination 11. In FIGS. 2A-2H, a "first"-type transition is produced in the middle of the bit cell containing the first binary "1". Of course, another "first" transition is produced in the middle of the bit cell containing the binary "1" which follows the successive binary "0"s. In FIGS. 3A-3I, the initial transition is a "second"-type transition which is produced at the trailing edge of the bit cell containing the binary "1" which procedes the successive "0"s. A "first"-type transition is produced in the middle of the bit cell containing the binary "1" which follows the successive "0"s.

Figure 2A:
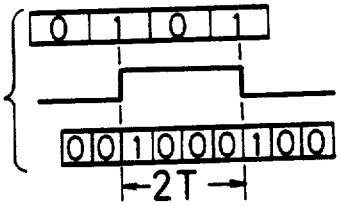
Figures 3A, 3B, 3C, 3D, 3E, 3F, 3G, 3H, 3I:
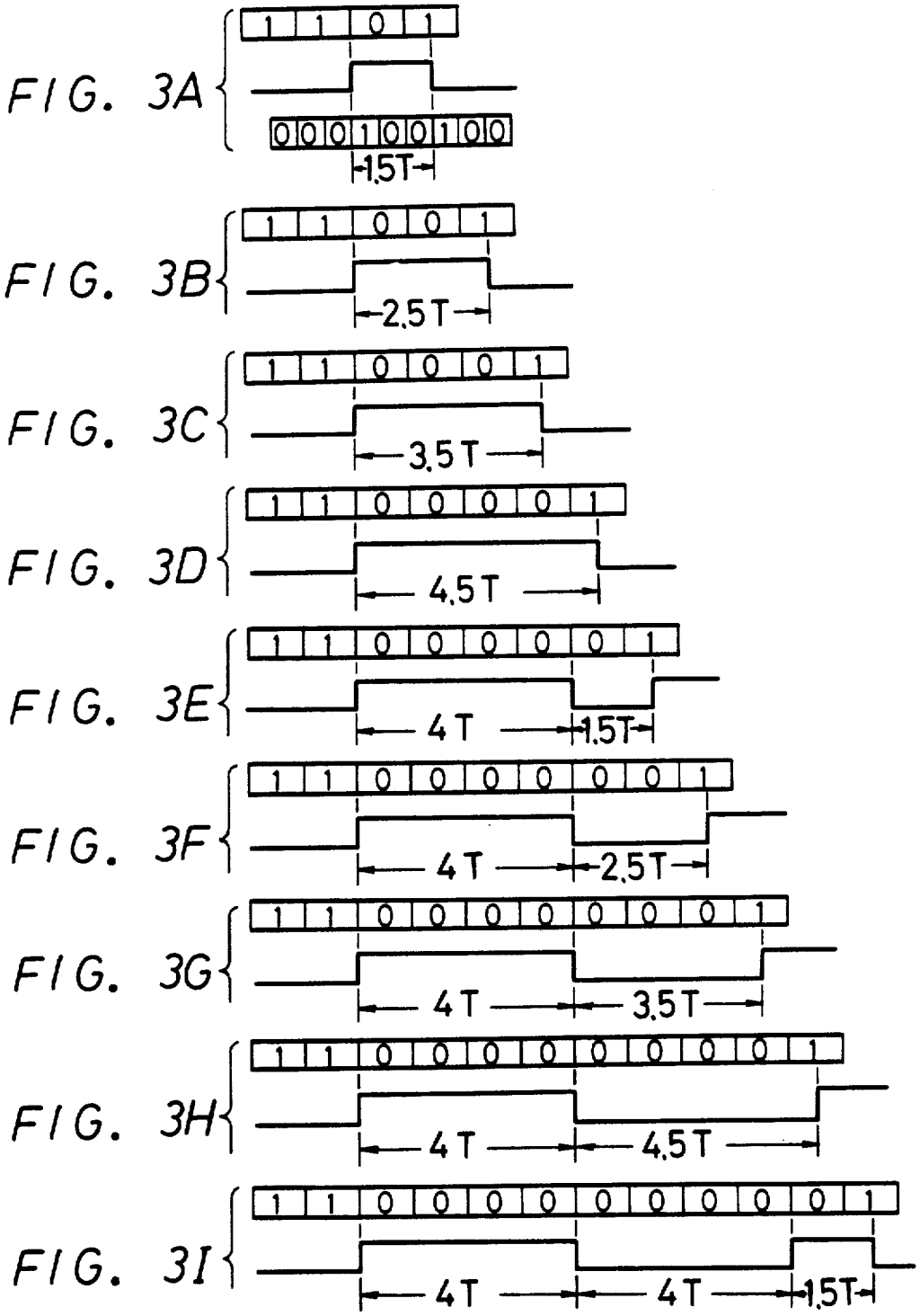

In FIG. 2A, a transition is produced in the middle of each bit cell containing a binary "1", and these transitions are seen to be separated by 2T. In FIG. 3A, the initial transition is produced at the boundary between the bit cells containing the binary "1" and binary "0", respectively, and the next-following transition is produced in the middle of the bit cell containing the next binary "1". Hence, in FIG. 3A, the illustrated transitions are separated by 1.5T.

Figure 2B:
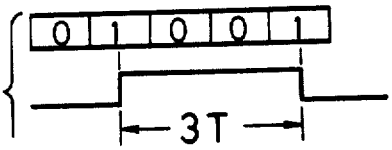

In FIG. 2B, transitions are produced in response to the change-over of a binary "0" to a binary "1" thereby resulting in a separation of 3T between these transitions. It is preferred that a transition not be produced at the boundary between successive binary "0"s because this will result in two succeeding "transition intervals " exhibiting minimum separation $T_{min}=1.5T$. In FIG. 3B, the initial transition is produced at the boundary between the prefix 11 and the successive binary "0"s; and the next-following transition is produced in response to the change-over from binary "0" to binary "1". This latter transition is a "first"-type transition and, thus, occurs in the middle of the bit cell containing the changed-over binary "1".

Figure 2C:
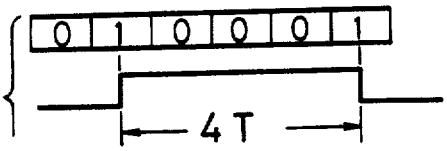

As shown in FIG. 2C, when the input digital data is [010001], transitions are produced at the middle of those bit cells which contain a binary "1". Hence, these transitions are separated by the transition interval of 4T. It is preferred that a transition not be produced at the trailing edge of the bit cell containing the first of the successive binary "0"s in order to distinguish successive binary "0"s from successive binary "1"s. It is recalled that, in response to successive binary "1"s, the first two transitions are separated by the minimum transition interval $T_{min}=1.5T$. Also, to improve such discrimination between successive "1"s and "0"s, it is preferred that a transition not be produced at the trailing edge of the bit cell containing the second binary "0". Likewise, in FIG. 3C, the beginning of the successive binary "0"s is represented by a "second"-type transition, and it is preferred not to produce another of these "second"-type transitions at the trailing edge of the bit cell containing the second binary "0".

Figure 2D:
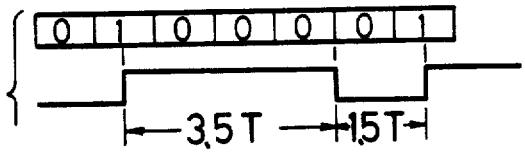
Figure 2E:
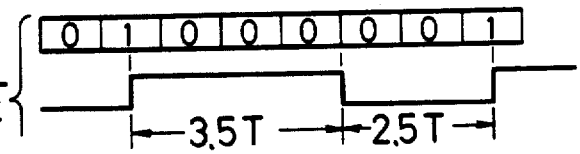
Figure 2F:
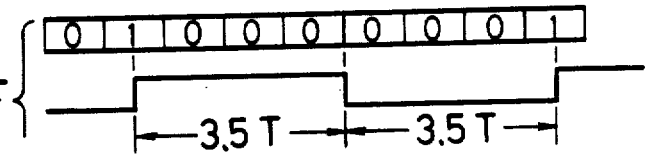

FIG. 2D represents the input digital data [0100001]. If this data is encoded by producing transitions only in the middle of the bit cells containing the illustrated binary "1"s, then the separation between such transitions would be equal to 5T. In the present invention, the maximum separation, or transition interval $T_{max}$, is selected to be 4.5T. Hence, if the input digital data of FIG. 2D is encoded in the aforementioned manner, the separation between transitions would exceed $T_{max}$. To avoid this possibility, a "second"-type transition is produced at the trailing edge of the bit cell containing the third binary "0", as illustrated. This results in a separation between the first two transitions of 3.5T, and a separation between the last two transitions of 1.5T. Thus, the illustrated transition intervals are greater than $T_{min}$ and less than $T_{max}$.

In FIG. 3D, if a transition is produced at the trailing edge of the bit cell containing the third binary "0", the resultant transition intervals in the encoded waveform will be greater than $T_{min}$ and less than $T_{max}$. However, if a "second"-type transition is produced at the beginning of the successive binary "0"s, and then the next transition is not produced until after the change-over from binary "0" to binary "1", as illustrated, the resultant transition interval will be equal to $T_{max}=4.5T$. This latter encoding is preferred.

From FIGS. 2C and 2D, and also from FIGS. 3C and 3D, it is observed that, if the input digital data contains three or more successive binary "0"s, then the transition interval between the first two transitions should be no less than 3.5T. In view of this condition, a transition is not provided at the boundary between the last two binary "0"s in FIG. 3D.

From FIGS. 2E–2H, it is appreciated that, if successive binary "0"s are preceded by the combination 01, then, after the first transition (which is produced at the middle of the bit cell containing the binary "1"), the next transition is produced after three successive binary "0"s, and, thereafter, a "second"-type transition is produced after the next 4 successive binary "0"s. However, a "second"-type transition is not produced after 4 successive binary "0"s if to do so would result in a separation thereof from a "first"-type transition by less than $T_{min}=1.5T$. It is for this reason that a "second"-type transition is not produced after the final 4 binary "0"s in FIG. 2G. However, since this minimum separation requirement is not violated in FIG. 2H, a "second"-type transition is produced at the trailing edge of the bit cell containing the fourth binary "0" in the group of four "0"s, as illustrated. Thus, if the input digital data contains 4 or more successive binary "0"s which are preceded by the combination 01, then the transition interval defined by the first two transitions which are used as an encoded representation of the input digital data is equal to 3.5T.

From FIGS. 3D–3I, it is seen that, if 4 or more successive binary "0"s are preceded by the combination 11, an initial transition is produced at the boundary between the bit cells containing the change-over from binary "1" to binary "0", and another transition is produced at the trailing edge of the bit cell containing the fourth binary "0", provided that the transition interval between this transition and the next-following transition is not less than $T_{min}=1.5T$. In FIG. 3D, if a transition is produced at the trailing edge of the bit cell containing the fourth binary "0", the transition interval between this transition and the "first"-type transition produced at the middle of the next-following bit cell will be less than $T_{min}$. Hence, and as shown in FIG. 3D, a "second"-type transition is not produced at the trailing edge of the bit cell containing the fourth binary "0", resulting in a transition interval equal to $T_{max}=4.5T$. But, since the minimum transition interval $T_{min}$ is equaled or exceeded when 5 or more successive binary "0"s are present, as shown in FIGS. 3E–3I, a "second"-type transition is produced at the trailing edge of the bit cell containing the fourth binary "0".

Consequently, in FIGS. 3E–3I, the transition interval between the first two transitions of the encoded waveform is equal to 4T. Thereafter, another "second"-type transition is produced after every 4 binary "0"s, unless the separation between this "second"-type transition and the next-following transition, such as the "first"-type transition shown in FIG. 3H, is less than $T_{min}=1.5T$.

A comparison between FIGS. 2D–2H and 3E–3I indicates that the transition interval between the first two transitions in the encoded waveform representing successive binary "0"s is equal to either 3.5T or 4T. From FIG. 1, it is recalled that this initial transition interval is on the order of 1.5T. Hence, depending upon the initial transition interval, the encoded waveform representing successive binary "1"s can be distinguished easily from the encoded waveform representing successive binary "0"s.

Figure 2G:
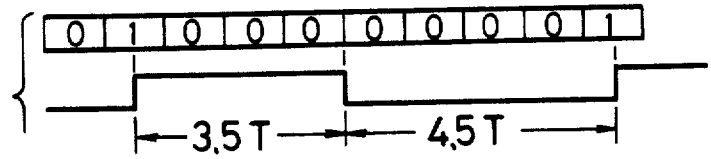
Figure 2H:
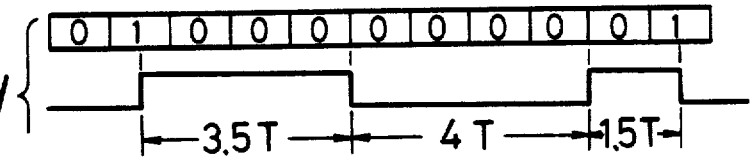

Also, it is seen that, when successive binary "0"s are encoded in the manner discussed above, the maximum transition interval $T_{max}$ is limited to 4.5T, as shown in FIG. 2G and FIGS. 3D and 3H.

The encoding technique represented in FIGS. 2 and 3 may be described, generally, as producing a "first"-type transition at the middle of a bit cell containing a binary "1" when the input digital data changes over from a binary "0" to a binary "1", and a "second"-type transition is produced at the trailing edge of a bit cell after every m successive binary "0"s wherein m=3 or 4. This general description is further limited by the condition that a transition interval will not exceed $T_{max}=4.5T$, nor will a transition interval be less than $T_{min}=1.5T$. Furthermore, m=3 to define the first transition interval when successive binary "0"s are preceded by the combination 01 and m=4 to define the first transition interval when successive binary "0"s are preceded by the combination 11. Thereafter, the transition interval between succeeding "second"-type transitions is seen to be 4T, as shown in FIG. 2H and FIGS. 3E–3I. Also, it is preferred that, where possible, the transition interval between the first two transitions in the encoded waveform be less than $T_{max}=4.5T$.

In any sequence of successive bits, minimum and maximum transition intervals $T_{min}$ and $T_{max}$ occur only once in a sequence. That is, in the encoded waveform representing successive binary "1"s or "0"s, the minimum transition interval is not present more than once and, likewise, the maximum transition interval also is not present more than once. It is appreciated that input digital data containing successive binary "0"s may be encoded as represented by FIG. 2 or FIG. 3, depending upon whether the successive binary "0"s are preceded by the combination 01 or by the combination 11. In any event, when 3 or more successive binary "0"s are present, the initial transition interval is no less than 3.5T. However, when the input digital data contains successive binary "1"s, the largest transition interval contained in the encoded waveform is 3T, as shown in FIGS. 1E, 1G, 1I and 1K. Therefore, in order to distinguish the encoded representation of successive binary "0"s from successive binary "1"s, the received transition intervals are compared to a reference predetermined interval which, in the present example, is selected to be equal to 3.5T. That is, in order to decode the waveforms produced by the encoder of the present invention, the separation between succeeding transitions is compared to this 3.5T standard. If the detected separation is less than 3.5T, it is assumed that the encoded waveform represents successive binary "1"s. Conversely, if the detected separation between succeeding transitions in the encoded waveform is greater than 3.5T, the transitions are assumed to represent successive binary "0"s.

One embodiment of encoding apparatus which is readily adapted to carry out the encoding technique discussed hereinabove with respect to FIGS. 1–3 is illustrated in FIG. 4. Encoder 1 is comprised of a shift register 2, a read only memory (ROM) 5, a shift register 6, a multi-stage shift register 8 and a logic gating circuit 11. Shift register 2 is illustrated as a three-stage shift register having an input terminal 3 to which input digital data is supplied, and a shift pulse input 4 connected to receive timing pulses, also referred to as clock pulses $CP_1$. Digital data is shifted from right-to-left, one stage at a time, in response to each timing pulse supplied to shift register 2. As illustrated, an input bit is shifted into stage $a_3$, and then from stage $a_3$ to stage $a_2$, and then from stage $a_2$ to stage $a_1$, all in synchronism with successive timing pulses $CP_1$. The contents of stages $a_1$, $a_2$ and $a_3$ are supplied as three bits of a 4-bit address signal to ROM 5. The fourth bit of this address signal is designated as bit x supplied to ROM 5 by logic gating circuit 11, to be described.

ROM 5 may be a conventional read only memory having, for example, sixteen separate storage locations, each storage location being addressed by the 4-bit address signal supplied thereto, and each of the sixteen storage locations storing a 2-bit signal. This 2-bit signal is read out from the addressed storage location of ROM 5 and loaded, parallel-by-bit, into shift register 6. As illustrated, shift register 6 is a 2-bit shift register having stages $b_1$ and $b_2$ therein.

Shift register 6 includes a load input terminal 7 adapted to receive a load pulse LD for loading the 2-bit signal read out of ROM 5 into stages $b_1$ and $b_2$. This shift register also includes a shift pulse input coupled to a clock pulse terminal 9 for receiving clock, or timing pulses $CP_2$. The contents of shift register 6 are shifted in synchronism with clock pulses $CP_2$ in the right-to-left direction. Hence, in response to two successive clock pulses $CP_2$, the bit loaded into stage $b_1$ is shifted out therefrom while the bit which had been loaded into stage $b_2$ is shifted thereinto, and then this bit is shifted out of stage $b_1$. The output of shift register 6 is supplied serially-by-bit to multi-stage shift register 8 which, in the illustrated embodiment, is an 8-stage shift register including stages A–H. This shift register also includes a shift pulse input connected to clock pulse input terminal 9 to receive clock pulses $CP_2$ so as to synchronously shift bits therethrough in the right-to-left direction in response to each clock pulse. An output terminal 10 is coupled to the left-most stage A to receive the contents of shift register 8 which has been serially shifted therethrough.

Each stage A–H of shift register 8 is coupled to a respective input of logic gating circuit 11. An additional input of this logic gating circuit is coupled to stage $a_1$ of shift register 2. The logic gating circuit combines the various bits supplied thereto from shift registers 2 and 8 to produce bit x of the 4-bit address supplied to ROM 5. This logic gating circuit implements the Boolean equation:

$$x=(A+B).(\overline{C+D}).(\overline{E+F}).(\overline{G+H}).\overline{a_1}+(G+H).a_1 \qquad (1)$$

Although not described in detail herein, one of ordinary skill in the art would be enabled to construct a suitable logic gating circuit to implement the foregoing equation.

In operation, clock pulses $CP_1$ are supplied via clock input terminal 4 to shift register 2. These clock pulses serve to serially shift into shift register 2 the particular digital data supplied thereto via input terminal 3. Clock pulses $CP_1$ are illustrated in FIG. 6A. For the purpose of the present discussion, it may be assumed that a binary bit is shifted into stage $a_3$ of shift register 2 in response to the positive-going transition of clock pulse $CP_1$. Furthermore, each positive transition of clock pulse $CP_1$ serves to shift the contents of shift register 2 to the left by one stage. Prior to loading the next bit of the input digital data into shift register 2, the contents of ROM 5 are read out therefrom in response to the 4-bit address supplied thereto, this 4-bit address being constituted as $(xa_1a_2a_3)$. This data read out of ROM 5 is loaded into shift register 6 in response to the load pulse LD, shown in FIG. 6C. Then, after shift register 6 is loaded with data represented as $b_1b_2$, this 2-bit data is shifted into shift register 8 in response to the next 2 successive clock pulses $CP_2$ shown in FIG. 6B. The contents of shift register 8 (ABCDEFGH), together with bit $a_1$ in shift register 2, are supplied to logic gating circuit 11 to produce bit x. Thereafter, the 4-bit address ($xa_1a_2a_3$) reads out bits $b_1b_2$ from ROM 5, these bits being loaded into shift register 6. The foregoing cycle is repeated periodically at the rate determined by clock pulses $CP_1$. This cycle interval ECC is illustrated in FIG. 6.

As an example of the operation of the encoder shown in FIG. 4, let it be assumed that the input digital data [0111110], shown in FIG. 1E, is supplied to input terminal 3. Let it be further assumed that, initially, the contents of shift register 8 are reset to zero, bits $b_1b_2$ are (00) and bits $a_1a_2a_3$ are (000). It is further assumed that successive clock pulses $CP_2$ are generated at times $t_0$, $t_1$, $t_2$ . . . , and clock pulses $CP_1$, which are one-half the frequency of clock pulses $CP_2$, are generated at times $t_0$, $t_2$, $t_4$. . . . At time $t_0$, the binary "0" of the input digital data is loaded into stage $a_3$ of shift register 2. Also, at times $t_0$ and $t_1$, bits $b_1b_2$, which are assumed to be (00), are shifted into stages G and H, respectively. Thus, at time $t_1$, logic gating circuit 11 is supplied with bits A–H and $a_1$, all of which are a binary "0". From the foregoing equation, it is appreciated that bit x also is a binary "0". FIG. 5 illustrates the "memory map" of ROM 5, from which it is appreciated that bits (00) are read out therefrom. These bits are loaded into shift register 6 in response to the load pulse LD following time point $t_1$.

At time $t_2$, the binary "1" included in the input digital data is loaded into stage $a_3$. At times $t_2$ and $t_3$, the contents (00) of shift register 6 are loaded into stages G and H of shift register 8, and the contents (00) previously stored in stages G and H are shifted into stages E and F, respectively. Logic gating circuit 11 produces a binary "0" as bit x, such that ROM 5 now is addressed by the address signal (0001). As shown in FIG. 5, ROM 5 now supplies the bits (00) to shift register 6 in response to the load pulse LD which is produced after time point $t_3$.

At time $t_4$, the next binary "1" of the input digital data is loaded into stage $a_3$, and the binary "1" previously stored in stage $a_3$ is loaded into stage $a_2$. Bits (00) which had been loaded into shift register 6 in response to the load pulse LD preceding time point $t_4$ are shifted into stages G and H at times $t_4$ and $t_5$. At these times, the contents of stages E and F are shifted into stages C and D, and the contents previously stored in stages G and H are shifted into stages E and F. Logic gating circuit 11 still is supplied with 0 . . . 0 to produce a binary "0" as bit x. Now, however, ROM 5 is addressed by the address signal (0011) to supply bits (01) to shift register 6. These bits are loaded into the shift register in response to the next load pulse LD which precedes time point $t_6$.

At time $t_6$, the third binary "1" of the input digital data is shifted into stage $a_3$, the binary "1" previously stored in this stage is shifted into stage $a_2$, and the binary "1" previously stored in stage $a_2$ is shifted into stage $a_1$. Furthermore, at times $t_6$ and $t_7$, the contents (01) of shift register 6 are shifted into stages G and H, respectively, and, of course, the contents of stages C and D are shifted into stages A and B, the contents of stages E and F are shifted into stages C and D, and the contents previously stored in stages G and H are shifted into stages E and F. Now, logic gating circuit 11 is supplied with a binary "1" from stage H and also with a binary "1" from stage $a_1$ of shift register 2. In accordance with the preceding Boolean equation, logic gating circuit 11 produces a binary "1" as bit x. Consequently, ROM 5 now is addressed with the address signal (1111) to supply bits (000) to shift register 6. The load pulse LD produced between times $t_7$ and $t_8$ loads shift register 6 with this (00) information.

The foregoing operation is repeated cyclically as the input digital data is shifted through shift register 2. Hence, encoder 1 operates such that, at times $t_{15}$, $t_{18}$ and $t_{24}$, a binary "1", whose duration is equal to one-half the period of clock pulses $CP_1$, is shifted to output terminal 10 from shift register 8. Thus, a binary "1" of duration 0.5T is produced at times $t_{15}$, $t_{18}$ and $t_{24}$. These binary "1"s represent the transitions of the encoded waveform; and if supplied to a flip-flop circuit, a toggle circuit, or the like will result in the waveform illustrated in FIG. 1E.

It will be appreciated that encoder 1 functions to encode successive binary "1"s and successive binary "0"s in the manner described hereinabove with respect to FIGS. 1–3. Thus, transitions having the aforenoted transition intervals are produced as encoded representations of the input digital data supplied to input terminal 3.

In the foregoing description of encoder 1, it has been assumed that a read only memory is used to supply shift register 6 with bits $b_1b_2$ in response to the 4-bit address signal ($xa_1a_2a_3$). If desired, this read only memory may be replaced by a logic gating circuit to implement the table shown in FIG. 5. More particularly, the logic gating circuit may be used to implement the following Boolean equations:

$$b_1 = \overline{x}.a_1.(\overline{a_2}+a_3)+x.\overline{a_1}.\overline{a_2} \quad (2)$$

$$b_2\overline{a} = {}_1.a_2 \quad (3)$$

It is seen that the combination of shift register 2 and logic gating circuit 11 functions to sense the presence and number of successive binary "1"s or "0"s in the digital data supplied to input terminal 3. ROM 5 is addressed in response to the sensing of such data to read out therefrom signals which are used to produce "first"-type transitions (if the bit $b_1$ is a binary "1") or "second"-type transitions (if the bit $b_1$ is a binary "1"). The foregoing equation (1) in combination with reading out of the stored contents of ROM 5 insures a minimum transition interval $T_{min}=1.5T$, a maximum transition interval $T_{max}=4.5T$ and a transition interval no greater than 4T between "second"-type transitions, in the encoded data produced at output terminal 10. This combination also serves to determine if the total number of successive binary "1"s, for example, is greater than 3, is odd or is even. Furthermore, encoder 1 functions to sense the appropriate number of successive binary "0"s in order to produce the respective transitions discussed above with respect to FIGS. 2 and 3.

The encoded waveform derived by encoder 1 may be recorded on a suitable record medium, such as magnetic tape, a magnetic disc, or the like. As one example, the encoded waveform may be recorded on a disc similar to a typical video disc. When recorded in this manner, it is desirable that a frame synchronizing signal FS also be recorded. This frame synchronizing signal is used during a reproduction operation to synchronize timing pulses which are used to decode the encoded waveform, and thus recover the original digital data. Preferably, the frame synchronizing signal FS is inserted into the encoded waveform. That is, it is not recorded in a separate location as a distinctive signal on the record medium. Consequently, it is necessary that the frame synchronizing signal FS be distinguishable from the encoded data, yet it should be of a similar format. One example of a suitable frame synchronizing signal is illustrated in FIGS. 7A and 7B.

The frame synchronizing signal is constituted by three transitions defining two successive transition intervals equal to $T_{max}=4.5T$. As mentioned above, the encoded data waveform representing successive binary "1"s and "0"s does not include consecutive transition intervals equal to $T_{max}$. Hence, the frame synchronizing signal FS is seen to be unique and may be readily detected when the encoded data waveform is reproduced or otherwise received.

Figure 7A:
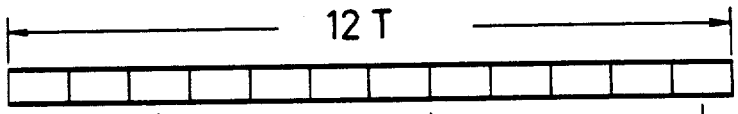
FIGS. 7A and 7B are timing diagrams which represent a synchronizing signal which can be inserted into the encoded data, in accordance with the present invention.
Figure 7B:
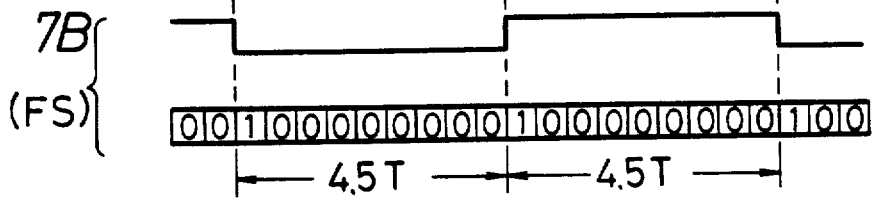

The relationship between the frame synchronizing sign FS and a number of successive bit cells is illustrated in FIGS. 7A and 7B. It is seen that the beginning and ending transitions of the frame synchronizing signal each coincides with the middle of a bit cell, and the middle, or intermediate transition of the frame synchronizing signal coincides with the boundary between adjacent bit cells. With this relationship, clock pulses may be synchronized with the respective frame synchronizing signal transitions. More particularly, clock pulses having a frequency similar to that of aforedescribed clock pulses $CP_1$ (FIG. 6A) may be synchronized with the intermediate transitions of the frame synchronizing signal; and clock pulses having a frequency similar to the aforedescribed clock pulses $CP_2$(FIG. 6B) may be synchronized with the beginning and ending transitions of the frame synchronizing signal. As will be described below, such synchronized clock pulses may be used to decode the encoded data waveform so as to recover the original digital data.

The frame synchronizing signal comprises two successive transition intervals, each equal to $T_{max}$, which are present during an overall duration equal to 12T. It will be appreciated that encoder 1 does not produce an encoded waveform whereby two transition intervals $T_{max}$ are produced during a duration of 12T. Hence, the frame synchronizing signal may be readily detected merely by establishing a reference duration equal to 12T (or, if desired, equal to 11T) and by sensing consecutive transition intervals $T_{max}$ during such a reference duration. This frame synchronizing signal is used to synchronize the code bits which represent the transitions of the encoded data waveform, as well as the recovered binary bits. Furthermore, the frame synchronizing signal may be used to synchronize frame intervals which, in some applications, establish timing intervals in which data is recorded or transmitted.

Figure 8:
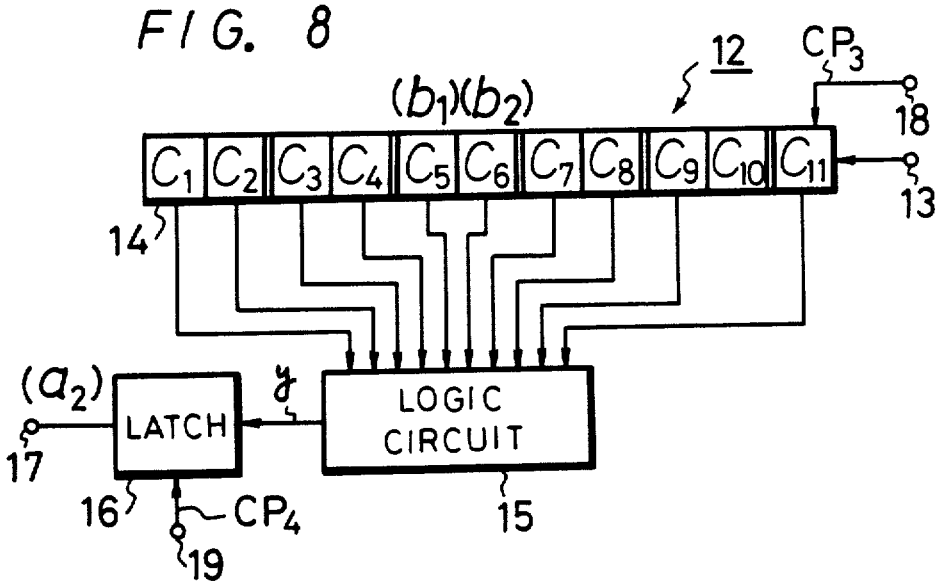
FIG. 8 is a block diagram of one embodiment of a decoder which can be used to decode the data that has been encoded by the present invention.

One embodiment of a decoder which is compatible with encoder 1 and which may be used to recover the original digital data from the encoded data waveforms shown in FIGS. 1–3 is illustrated in FIG. 8. This decoder 12 is comprised of a multi-stage shift register 14 having an input terminal 13 connected to receive a digitized version of the encoded data waveform, and a shift pulse input 18 connected to receive clock, or timing, pulses $CP_3$. Timing pulses $CP_3$ may be similar to aforedescribed timing pulses $CP_2$, having a frequency equal to twice the original data bit rate. Encoder 12 also includes a logic gating circuit 15, which may be comprised of conventional gating circuitry, adapted to implement the following Boolean equation:

$$y=C_6+C_5.(C_9+C_{11}.\overline{C_8})+C_4+C_3).(C_7+C_9)+(C-$$
$$-C_2+C_1).(C_7 \qquad (4)$$

wherein y is the output produced by the logic gating circuit in response to bits $C_1 \ldots C_{11}$ supplied thereto. These bits are the contents of corresponding stages in multistage shift register 14.

The output of logic gating circuit 15 is coupled to a latch circuit 16, which may comprise a timing pulse controlled flip-flop circuit, or the like, coupled to a clock, or timing, pulse input 19 to receive clock pulses $CP_4$. The output produced by latch circuit 16 may be either a binary "1" or a binary "0", depending upon the state of the input supplied thereto at the time of receipt of a clock pulse $CP_4$. This output is supplied to an output terminal 17.

Clock pulses $CP_3$ are synchronized with the beginning and ending transitions of frame synchronizing signal FS, and clock pulses $CP_4$ are synchronized with the intermediate transition of this frame synchronizing signal. It may be appreciated, therefore, that if the digitized version of the encoded data waveform supplied to input terminal 13 represents each transition as a binary "1" of one-half bit cell duration, when the binary "1" representing the beginning transition of the frame synchronizing signal shown in FIG. 7B is shifted from stage $C_{11}$ to stage $C_{10}$ in shift register 14, a clock pulse $CP_4$ is produced. Then, when this binary "1" is shifted from stage $C_9$ to stage $C_8$, and then from stage $C_7$ to stage $C_6$, and then stage $C_5$ to stage $C_4$, and then from stage $C_3$ to stage $C_2$, a respective clock pulse $CP_4$ is generated in timed synchronism therewith. It is further appreciated that successive clock pulses $CP_3$ serve to shift these bits from stage-to-stage of shift register 14 in the right-to-left direction.

As one example of the operation of decoder 12, let it be assumed that the encoded data waveform shown in FIG. 2G has been recorded. The original digital data [100000001] thus is represented by the waveform wherein a "first"-type transition is produced in the middle of a bit cell interval, the next-following transition is separated therefrom by 3.5T, and an ending transition is a "first"-type transition spaced from the intermediate transition by 4.5T. This encoded waveform is further converted by conventional means (not shown) to code bits of the type shown in FIGS 1A, 2A, 3A and 7B, wherein a transition is represented by a binary "1" code bit whose duration is equal to one-half of a bit cell interval. Thus, it is appreciated that the encoded data bits which represent the encoded waveform of FIG. 2G are constituted by a binary "1" bit in the second-half portion of a first bit cell interval, a binary "1" code bit in the first-half portion of the next-following fifth bit cell interval, and a binary "1" code bit in the second-half portion of the next-following ninth bit cell interval. Stated otherwise, let it be assumed that clock pulses $CP_3$ are generated at times $t_0, t_1, t_2 \ldots t_{16}, t_{17}, t_{18}, \ldots t_{22}$. The encoded data bits thus are present as binary "1"s in the intervals $t_1$–$t_2$, $t_8$–$t_9$ and $t_{17}$–$t_{18}$.

Clock pulses $CP_4$ are generated at one-half the rate of clock pulses $CP_3$ and are synchronized by the frame synchronizing signal FS such that these clock pulses are generated at times $t_0, t_2, t_4 \ldots t_{18}, t_{20}, t_{22}$.

Now, at time $t_0$, a binary "0" code bit is shifted into stage $C_{11}$ of shift register 14. At time $t_1$, the binary "1" code bit is shifted into this stage. This binary "1" code bit is shifted into stage $C_{10}$ at time $t_2$, into stage $C_9$ at time $t_3$, into stage $C_8$ at time $t_4$, into stage $C_7$ at time $t_5$, and into stage $C_6$ at time $t_6$. From equation (4), it is appreciated that an output y is produced by logic gate circuit 15 when a binary "1" is shifted into stage $C_6$. Hence, a binary "1" is produced as output y during the time interval $t_6$–$t_7$. At time $t_7$, the binary "1" in stage $C_6$ is shifted into stage $C_5$, and at time $t_8$, the binary "1" is shifted from stage $C_5$ into stage $C_4$. At this same time $t_8$, the next binary "1" code bit is shifted into stage $C_{11}$, and the aforedescribed shifting process is repeated.

From equation (4), it is seen that a binary "1" is produced at output y at time $t_{13}$, that is, at the time when the next binary "1" code bit which had been shifted into stage $C_{11}$ is shifted into stage $C_6$. Thereafter, a binary "1" is produced at output y at time $t_{22}$. This is in response to the last binary "1" code bit which is shifted into stage $C_{11}$ at time $t_{17}$, this last binary "1" code bit being shifted sequentially until it reaches stage $C_6$. Thus, a binary "1" is produced at output y at times $t_6$, $t_{13}$ and $t_{22}$.

The binary "1" output serves to set latch circuit 16 to a binary "1" condition only if the output y is a binary "1" concurrent with a clock pulse $CP_4$. When output y is a binary "0", latch circuit 16 is reset in response to clock pulses $CP_4$. Accordingly, in the foregoing example, latch circuit 16 is set in response to the binary "1" output y at time $t_6$, and then the latch circuit is reset at times $t_8$, $t_{10}$, $t_{12}$, $t_{14}$, $t_{16}$, $t_{18}$ and $t_{20}$. At the next clock pulse $CP_4$, which occurs at time $t_{22}$, the output y once again is a binary "1" to set latch circuit 16. Consequently, latch circuit 16 recovers the digital data signal [0100000001] at output terminal 17. This, of course, corresponds to the original input data shown in FIG. 2G.

Decoder 12 functions in a manner similar to that discussed hereinabove in order to recover the original digital data signal which may be supplied thereto as the encoded representation shown in FIGS. 1-3. In the interest of brevity, further description of the operation of decoder 12 is not provided. Nevertheless, it should be appreciated that logic gate circuit 15 functions to compare the representation of the transitions which are shifted to shift register 14 to predetermined "window" intervals. One of these window intervals effectively "measures" the separation between the first two transitions to determine if this separation is of an amount corresponding to a series of binary "1"s or a series of binary "0"s, as mentioned above. It is recalled that the transitions which represent successive binary "1"s are separated from each other by an amount less than the transitions which represent successive binary "0"s. In this regard, logic gating circuit 15 effectively compares the separation between transitions to two sets of "window" intervals: one set of "window" intervals representing the various separations which are associated with binary "1"s; and the other set of "window" intervals representing the separation associated with successive binary "0"s, as mentioned above. More particularly, these "window" intervals are substantially equal to the expected separations representing successive binary "1"s and "0"s. It is recalled that the expected separations representing successive binary "0"s are wider than the expected separations representing successive binary "1"s. When the actual separations correspond to a particular "window" interval, the corresponding binary bits are produced at output terminal 17 of latch circuit 16.

Hence, decoder 12 serves to compare the separation between transitions, as represented by the code bits, to the aforemenioned standard, or reference interval, whereby successive binary "1"s are produced when the transition intervals are less than this standard, and successive binary "0"s are produced when the transition intervals exceed this standard.

It is recognized that the 11-stage storage capacity of shift register 14 is sufficient to accommodate the code bits which represent at least three succeeding transitions in the encoded version of successive binary "1"s. That is, shift register 14 is sufficient to accommodate at least the encoded representation of the waveform shown in FIG. 1E. This shift register also has sufficient capacity to accommodate the encoded versions shown in FIGS. 2D and 3D.

Various modifications and changes may be made to decoder 12. For example, logic circuit 15 and logic circuit 16 may be replaced by a read only memory, similar to that used in encoder 1.

As discussed above, and as is apparent from FIGS. 1D, 1F, 1H and 1J, if the total number of successive binary "1"s in the input digital data is an even number, the binary "1"s may be divided into groups of two, and a "second"-type transition is produced in response to each group. If the total number of successive binary "1"s is an odd number, then the last group of binary "1"s will be constituted by three such bits. In that event, the "second"-type transition is produced after these three bits have been sensed. It is seen, therefore, that the greatest transition interval in the encoded version of successive binary "1"s is equal to 3T. Therefore, to distinguish successive binary "1"s from "0"s, the aforementioned reference, or standard, interval is selected as being equal to 3.5T. A transition interval that is less than this standard thus is representative of successive binary "1"s; and a transition interval that exceeds this standard is representative of successive binary "0"s.

Figure 9:
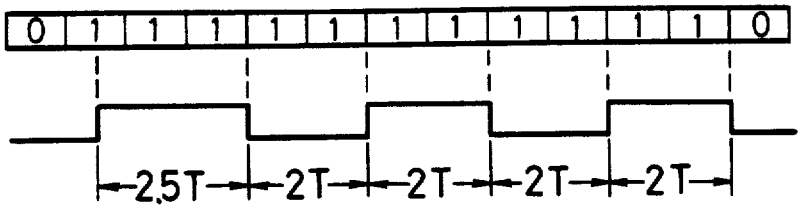
FIG. 9 is a timing diagram representing a modification of the encoding technique of the present invention.

As an alternative, if the odd or even nature of the total number of successive binary "1"s is known prior to encoding, the aforementioned standard interval can be reduced from 3.5T to 2.5T. As shown in FIG. 9, if it is known that the total number of successive binary "1"s is an odd number, then the bits may be divided into a first group of three binary "1"s, followed by succeeding groups of two binary "1"s. If "second"-type transitions are produced at the boundaries between adjacent groups, the encoded waveform will appear as shown in FIG. 9. As illustrated, the initial transition interval is equal to 2.5T because it is derived from the group of three binary "1"s. This initial transition interval is followed by succeeding transition intervals, all equal to 2T, because these latter transition intervals are derived from groups of two binary "1"s. Thus, a transition interval of 3T is avoided. The original input data shown in FIG. 9 corresponds to that shown in FIG. 1K, and the differences between these encoding schemes are readily apparent. Of course, if it is known that the total number of successive binary "1"s is an even number, then these bits are divided into groups of two, resulting in the encoded waveforms shown in, for example, FIGS. 1F, 1H and 1J. Thus, for an odd number of binary "1"s, the initial transition interval is equal to 2.5T; whereas for an even number of successive binary "1"s, the initial transition interval is equal to 1.5T. With this modification, if the reference, or standard interval which is used to discriminate the encoded representation of successive binary "1"s and "0"s is reduced from 3.5T to 3T, the maximum transition interval $T_{max}$ may be correspondingly reduced from 4.5T to 4T. As a result, the second transition interval shown in FIG. 2G would be reduced from 4.5T to 3.5T, the second transition interval shown in FIG. 2H would be reduced from 4T to 3T, the transition shown in FIG. 3D would be replaced by a first transition interval of 3T followed by a second transition interval of 1.5T, and the like.

Of course, to best implement the foregoing modification, a buffer memory should be provided so as to store the successive binary "1"s of the input digital data, thereby indicating whether the successive binary "1"s constitute an odd or even number. Since, in a practical application, an infinite number of successive binary "1"s is not provided, suitable buffer memories are readily available.

As yet another alternative to the encoding technique described hereinabove, rather than determine, initially if the total number of successive binary "1"s is odd or even, these data bits may be divided into groups of two and, if the "remainder" of one bit remains, then the last 5 bits in the sequence are divided into two groups: one group of 3 bits and one group of 2 bits. A "second"-type transition is provided at the boundary between these two groups. In the example described above with respect to FIGS. 1E, 1G, 1I and 1K, the group of three successive binary "1"s was designated the last of the groups. In the example shown in FIGS. 10E, 10G, 10I and 10K, the group of three binary "1"s is designated the penultimate group, and the final group of binary "1"s is formed of two successive binary "1"s.

In the examples represented by the timing diagrams of FIG. 10, FIGS. 10A-10D are seen to be substantially identical to FIGS. 1A-1D, respectively. However, when the number of successive binary "1"s is 5 or greater, the last five of these bits are divided into two groups: a first group of three bits followed by a second group of two bits. Thus, in FIG. 10E, the first transition interval of 2.5T is derived from the first group of three bits, and the next-following transition interval of 2T is derived from the final group of two bits. In FIG. 1E, the illustrated five binary "1"s are divided into a first group of two bits, from which the transition interval of 1.5T is derived, followed by a final group of three bits, from which the transition interval of 3T is derived.

Figures 10A, 10B, 10C, 10D, 10E, 10F, 10G, 10H, 10I, 10J, 10K:
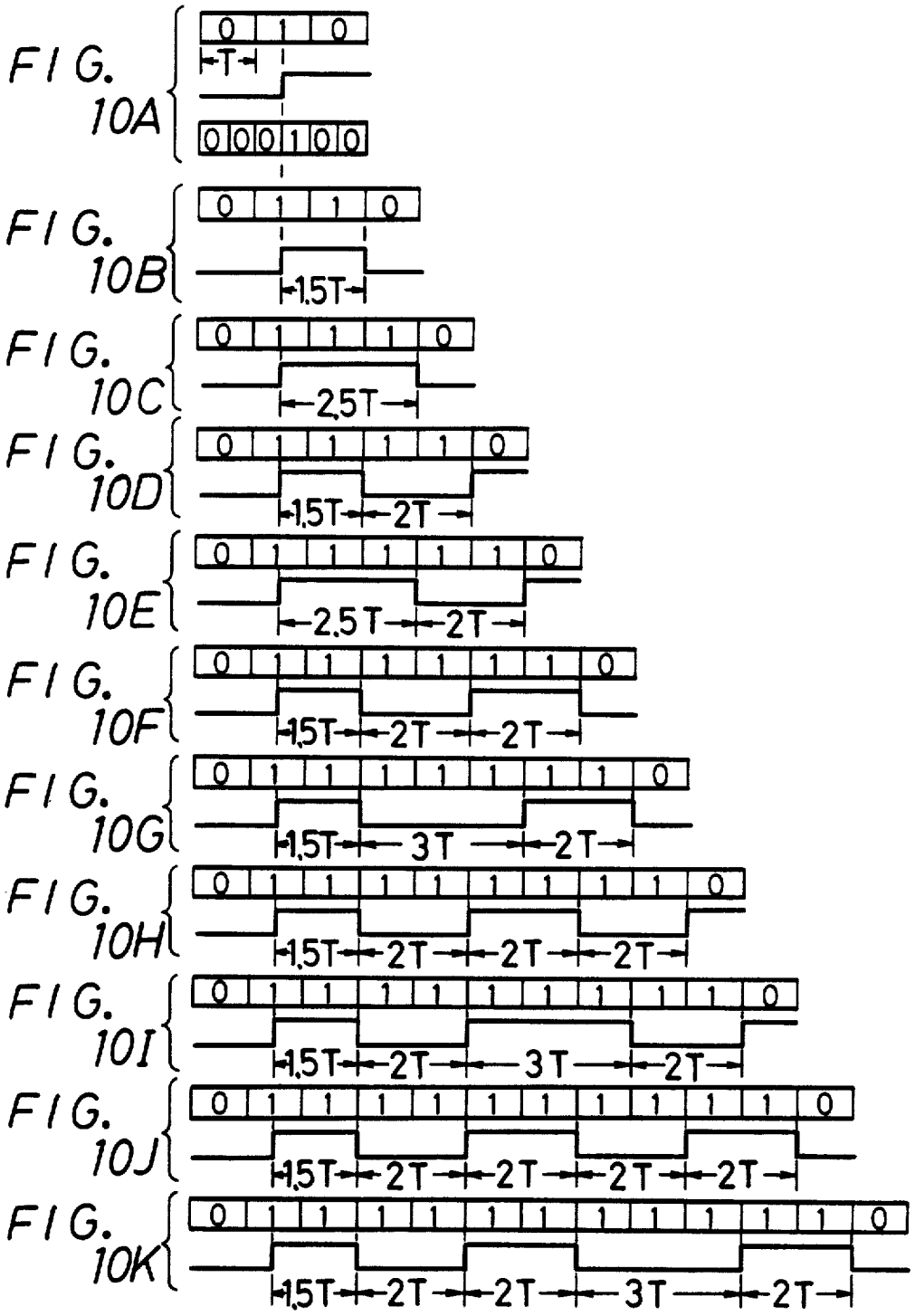
FIGS. 10A–10K and 11A–11K are timing diagrams which represent another embodiment of the encoding technique of the present invention.

In the timing diagrams shown in FIG. 10, the encoded waveforms representing an even number of successive binary "1"s are substantially identical to the encoded waveforms of FIG. 1 which also represent an even number of successive binary "1"s. This is observed by comparing FIGS. 10F and 1F, 10H and 1H, and 10J and 1J. However, when the input digital data contains an odd number of successive binary "1"s in excess of 4, FIG. 10 illustrates a final transition interval equal to 2T, derived from a final group of two successive binary "1"s, preceded by a transition interval of either 2.5T (FIG. 10E) or 3T, derived from the penultimate group of three successive binary "1"s. This arrangement is reversed in FIG. 1, as may be observed by comparing FIGS. 10E and 1E, 10G and 1G, 10I and 1I, and 10K and 1K.

Figures 11A, 11B, 11C, 11D, 11E, 11F, 11G, 11H, 11I, 11J, 11K:
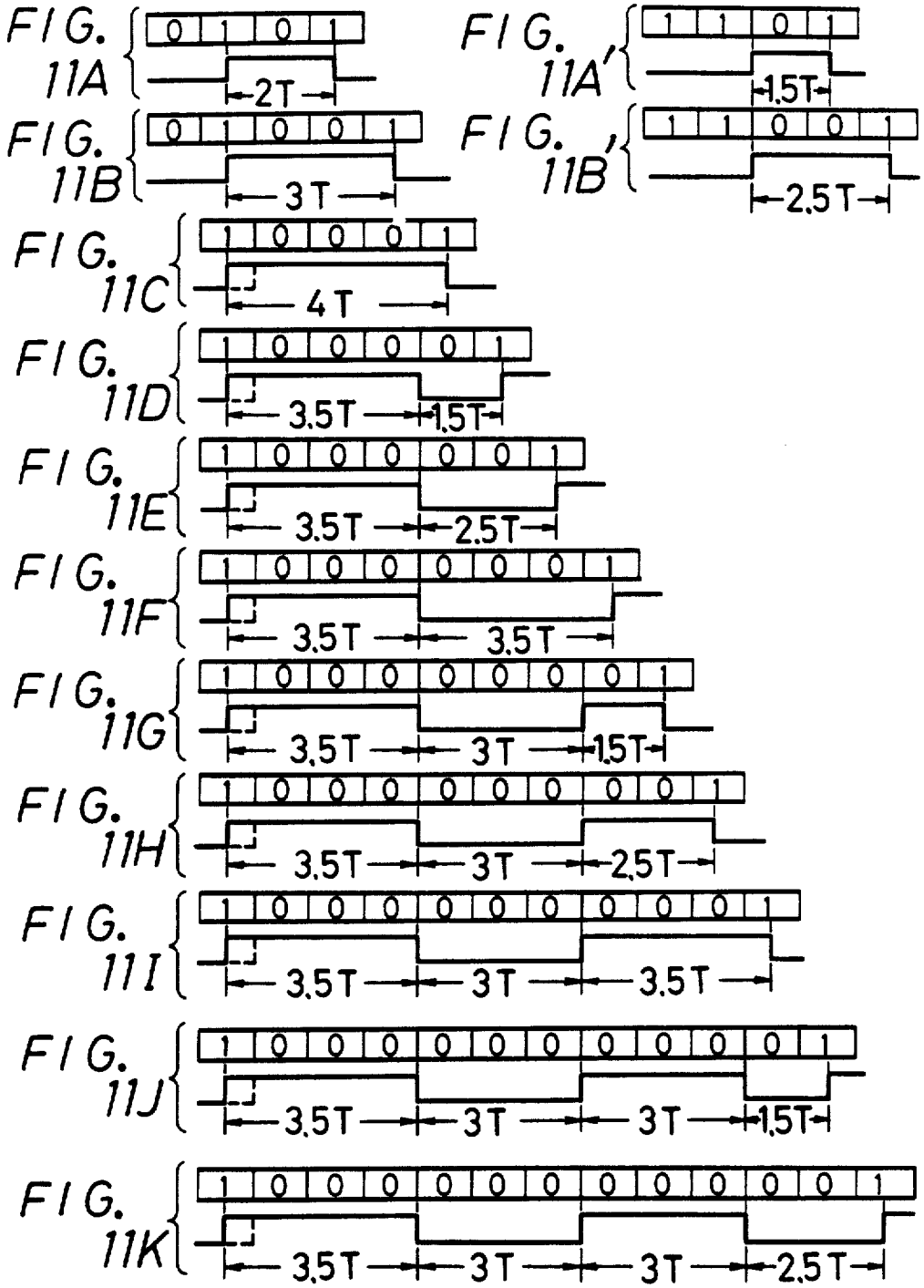

A similar modification in the encoding scheme may be used to encode successive binary "0"s, as indicated in FIG. 11. More particularly, in FIG. 11, successive binary "0"s are divided into groups of three; and a "second"-type transition is produced at the trailing edge of a bit cell in response to each group, provided that the minimum separation between transitions is not less than 1.5T. For the case of a single binary "0", shown in FIGS. 11A and 11A', the encoded waveform is similar to that discussed hereinabove with respect to FIGS. 2A and 3A, respectively. If the input digital data consists of only two successive binary "0"s, as shown in FIGS. 11B and 11B', the encoded waveforms are similar to those shown in FIGS. 2B and 3B, respectively. Likewise, if the input digital data is constituted by three successive binary "0"s, these three bits constitute a single group, resulting in the encoded waveform shown in FIG. 11C, similar to the encoded waveforms shown in FIGS. 2C and 3C.

In FIGS. 11C-11K, the encoded waveform having the first transition shown by the solid line represents that successive binary "0"s are preceded by the combination 01. The encoded waveform having the first transition shown by the broken line represents that successive binary "0"s are preceded by the combination 11.

In FIGS. 11D-11K, four or more successive binary "0"s are present. In accordance with the illustrated encoding scheme, the successive binary "0"s are divided into groups of three. After the first group of three binary "0"s, a "second"-type transition is produced. Thereafter, another "second"-type transition is produced after the next group of three binary "0"s, only if the separation between this last-mentioned "second"-type transition and the final "first"-type transition is not less than 1.5T. In FIG. 11F, if a "second"-type transition is produced in response to the second group of three binary "0"s, this "second"-type transition will be spaced from the final "first"-type transition by 0.5T. Since this condition is to be avoided, FIG. 11F illustrates that such a "second"-type transition is not produced in response to the last group of three binary "0"s.

However, in FIG. 11G, a "second"-type transition is produced in response to the second group of three binary "0"s; and this "second"-type transition is spaced from the final "first"-type transition by 1.5T.

It is seen from the waveforms shown in FIG. 11 that the maximum transition interval $T_{max}$ in this embodiment is equal to 4T. If four or more successive binary "0"s are present in the input digital data, the initial transition interval is equal to 3.5T if the binary "0"s are preceded by the combination 0.1, and the initial transition interval is equal to 3.0T when the binary "0"s are preceded by the combination 11. Thereafter, a "second"-type transition is produced in response to each group of three successive binary "0"s, provided that the minimum separation between succeeding transitions is no less than 1.5T. When this condition does not obtain, as shown in FIGS. 11F and 11I, the "second"-type transition is not produced.

The encoded waveforms shown in FIGS. 10 and 11 are distinguishable from each other in that, for example, except for FIG. 11A, a transition interval of 2T is not present in the encoded representation of successive binary "0"s. Furthermore, in the encoded representation of successive binary "1"s, the initial transition interval is equal to 1.5T, whereas the initial transition interval associated with the encoded representation of successive binary "0"s is either 3T or 3.5T. Still further, for an even number of successive binary "1"s, succeeding transition intervals of 2T are present, and for an odd number of successive binary "1"s, the last two transition intervals are seen to be 3T followed by 2T. These characteristics are not present in the encoded representations of successive binary "0"s. These differences can be used in a modification of the decoder shown in FIG. 8, whereby successive binary "0"s can be distinguished from successive binary "1"s as represented by the encoded waveforms.

Figure 12:
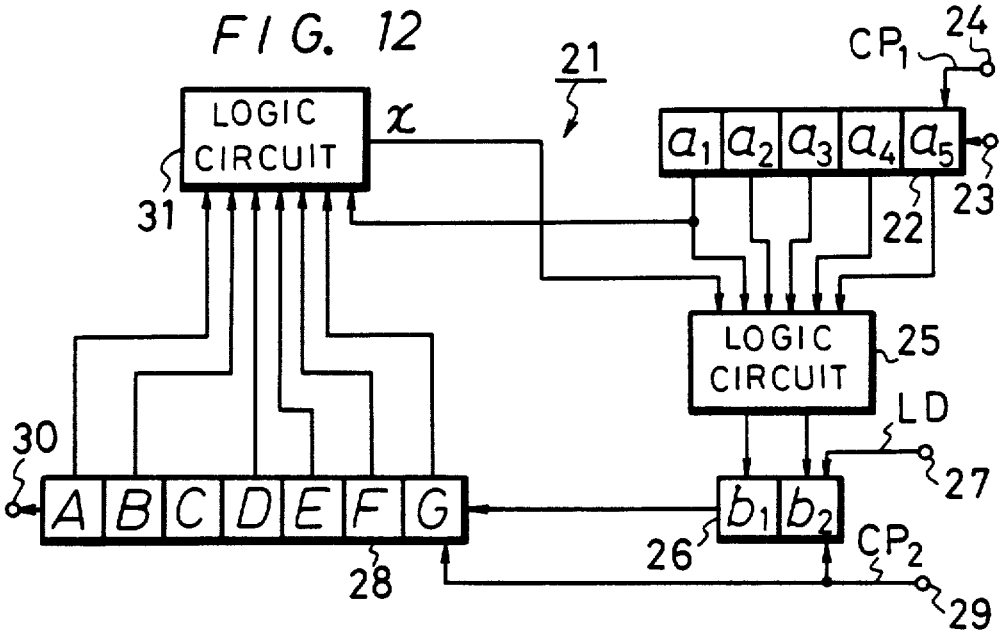
FIG. 12 is a block diagram of an encoder which can be used to carry out the encoding technique represented by the timing diagrams of FIGS. 10 and 11.

FIG. 12 is a block diagram of an encoder 21 which is readily adapted to carry out the encoding scheme represented by the timing diagrams of FIGS. 10 and 11. It is appreciated that encoder 21 is similar to encoder 1 of FIG. 4, and includes a shift register 22, similar to shift register 2, but comprised of five stages $a_1 \ldots a_5$, a logic circuit 25, which performs a function analogous to ROM 5, a shift register 26, similar to aforedescribed shift register 6, a multi-stage shift register 28, similar to shift register 8, and a logic gating circuit 31, similar to aforedescribed logic gating circuit 11. Shift register 22 is coupled to a data input terminal 23, from which successive binary bits of the input digital data are received. The shift register also is coupled to a clock pulse input terminal 24 to receive clock pulses $CP_1$, described above.

The contents of stages $a_1a_2a_3a_4a_5$ of shift register 22, together with bit x, are supplied to logic circuit 25. Depending upon the status of the respective bits supplied thereto, this logic circuit generates bits $b_1b_2$, which bits are supplied in parallel to shift register 26. More particularly, logic circuit 25 produces bits $b_1$ and $b_2$ in accordance with the following Boolean equations:

$$b_1 = \overline{x.a_1}a_2 + x.a_1.(a_2 + \overline{a_3a_4a_5}) \quad (5)$$

$$b_2a = \overline{1}.a_2 \quad (6)$$

As before, bits $b_1$ and $b_2$ are loaded, parallel-by-bits into shift register 26 in response to a load pulse LD (FIG. 6C).

Shift register 26, as well as multi-stage shift register 28, is coupled to a clock pulse input terminal 29 to receive clock pulses $CP_2$(FIG. 6B). Thus in response to successive ones of clock pulses $CP_2$, bits $b_1$ and $b_2$ are shifted from shift register 26 into sequential stages GFEDCBA of shift register 28. As each bit $b_1b_2$ is shifted out of stage A of the multi-stage shift register, code bits of one-half bit cell duration are generated, sequentially, at output terminal 30.

The contents of stages A . . . G of shift register 28, together with the contents of stage $a_1$ of shift register 22, are supplied to logic gating circuit 31. This logic gating circuit implements the following Boolean equation to produce bix x:

$$x = (A+B).\overline{(D+E)}.\overline{(F+G)}.a_1 + (F+G).a_1 \quad (7)$$

Of course, bit x, in conjunction with bits $a_1a_2a_3a_4a_5$ in shift register 22 are used by logic circuit 25 to generate bits $b_1$ and $b_2$ in accordance with equations (5) and (6).

In the interest of brevity, and to avoid substantial duplication of explanation, a detailed description of the operation of encoder 21 is not provided. It will be readily apparent to those of ordinary skill in the art that this encoder operates in a manner similar to that described hereinabove with respect to the embodiment of encoder 1.

If desired, logic circuit 25 may be replaced by, for example, a read only memory having 64 storage locations, each being addressed by the 6-bit signal $xa_1a_2a_3a_4a_5$, and each storage location storing appropriate bits $b_1$ and $b_2$, so as to read out these bits to shift register 26 in response to the particular address signals supplied to the ROM.

Figure 13:
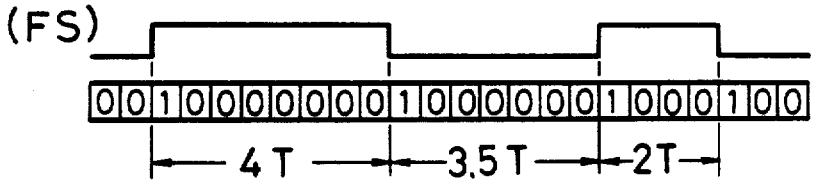
FIG. 13 is a timing diagram representing a synchronizing signal which can be inserted into the data encoded in accordance with the format represented by FIGS. 10 and 11.

It is appreciated that encoder 21 generates the encoded versions of successive binary "1"s and "0"s as illustrated in FIGS. 10 and 11. Advantageously, a frame synchronizing signal FS, fully distinguishable from the encoded data, is inserted into the encoded representations of digital data in order to synchronize the operation of a decoder which is compatible with the encoder shown in FIG. 12. It would appear that the frame synchronizing signal shown in FIG. 7B may be used with the encoder of FIG. 12. Another pattern of transition intervals which can be used as the frame synchronizing signal FS is illustrated in FIG. 13, together with the coded bits representing such transitions. Successive transition intervals of 4T, followed by 3.5T, followed by 2T, are not present in the encoded waveforms shown in FIGS. 10 and 11. Thus, the frame synchronizing signal represented in FIG. 13 is easily distinguished from the encoded data. The initial transition of this frame synchronizing signal may coincide with the middle of a bit cell interval or, alternatively, may coincide with the boundary between adjacent bit cell intervals.

Figure 14:
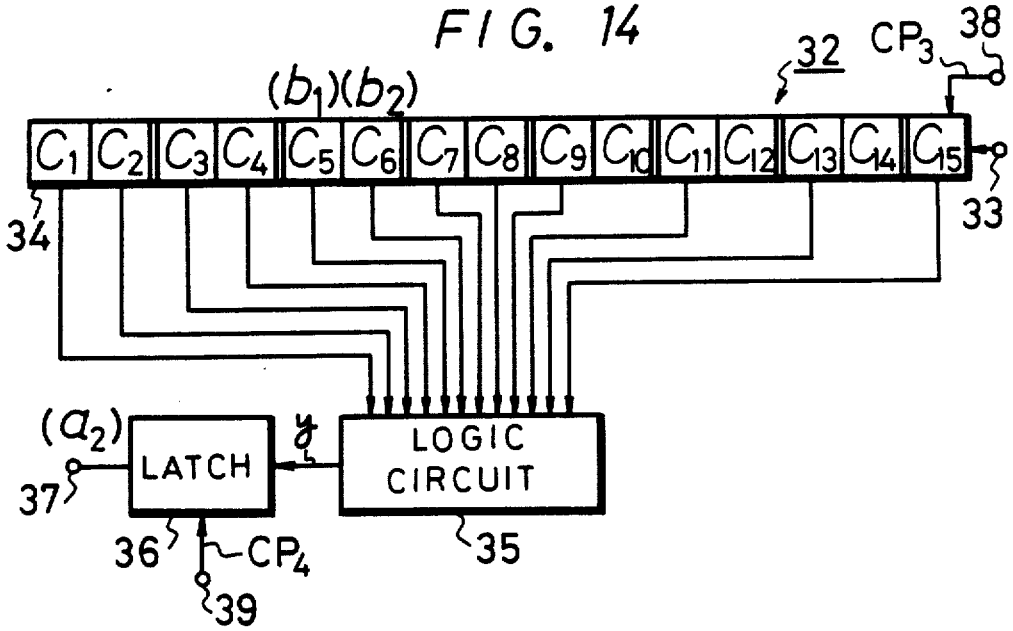
FIG. 14 is a block diagram of a decoder which is compatible with the encoder shown in FIG. 12.

FIG. 14 illustrates an embodiment of a decoder 32 which is compatible with encoder 21 and which is readily adapted to recover the original digital data in response to receiving coded bits corresponding to the encoded waveforms of FIGS. 10 and 11. Decoder 32 includes a shift register 34, comprised of stages $C_1 \ldots C_{15}$, a logic circuit 35 and a logic circuit 36. It is seen that this is similar to shift register 14, logic circuit 15 and logic circuit 16, respectively, of FIG. 8. Shift register 34 is connected to an input terminal 33 to receive coded bits representing the transitions of the encoded data. A shift pulse input of shift register 34 is coupled to an input terminal 38 to receive clock pulses $CP_3$. These clock pulses are similar to those described hereinabove with respect to FIG. 8.

The outputs of stages $C_1$–$C_9$, $C_{11}$, $C_{13}$ and $C_{15}$ all are coupled to respective inputs of logic circuit 35. This logic circuit implements the following Boolean equation:

$$y = C_6 + C_5.C_8.C_{11}.C_{15}.C_9.(C_3.C_{13} + C_4 + C_5) + C_7.(C_1. - C_{11} + C_2 + C_3 + C_4)$$

The resultant output y produced by logic circuit 35 is supplied to latch circuit 36. This latch circuit, being similar to aforedescribed latch circuit 16, is set or reset in timed synchronism with clock pulses $CP_4$, depending upon whether output y is a binary "1" or "0", respectively. The state of the latch circuit, that is, whether it is set or reset, is represented by an output signal supplied to output terminal 37. This output signal corresponds to the original input digital data which is recovered from the coded bits serially shifted into shift register 34.

The operation of decoder 32 is similar to that set out in detail hereinabove with respect to decoder 12. Therefore, in the interest of brevity, this explanation is not repeated. Suffice it to say, however, that as the representations of transitions are serially shifted through shift register 34, logic circuit 35 serves to compare the separation between such transitions to predetermined "window" intervals to produce an output y depending upon the relationship between the measured transition intervals and these "window" intervals.

If desired, logic circuit 35 may be replaced by a suitable ROM which is addressed by the contents of shift register 34 to read out a corresponding output y, consistent with equation (8).

If the encoded version of the input digital data, as produced by the embodiments of the encoder discussed hereinabove, are recorded as an audio PCM signal on, for example, a vide disc record medium, the frame synchronizing signal FS, discussed above, might not be recorded. In that event, clock pulses $CP_3$ and $CP_4$ must be derived from the reproduced data stream. Since the maximum transition interval $T_{max}$ is relatively short, in accordance with one advantageous feature of the present invention, such synchronous reproduction is readily obtained. Even if the actual transition interval in the reproduced data stream exceeds the aforementioned maximum, due to time base fluctuations, or the like, the encoded data nevertheless may be readily decoded.

While the present invention has been particularly shown and described with reference to certain preferred embodiments, it should be readily apparent to those of ordinary skill in the art that various changes and modifications in form and details may be made without departing from the spirit and scope of the invention. It is, therefore, intended that the appended claims be interpreted as including all such changes and modifications.

What is claimed is:

1. A method of decoding digital data having transitions therein, wherein the separation between succeeding transitions represents a particular number of successive binary bits of a particular bit value, said method comprising the steps of measuring the separation between succeeding transitions; determining if the separation between two succeeding transitions is less than or greater than a predetermined amount [substantially equal to the minimum separation between the first two transitions in data representing at least three successive binary bits of a first value, said minimum separation being greater than the maximum separation between succeeding transitions in data representing at least three successive binary bits of said first value]; producing successive binary bits of [said] *a* first value when said separation is determined to be less than said predetermined amount; and producing successive binary bits of a second value when said separation is determined to be greater than said predetermined amount. *; said predetermined amount being substantially equal to the minimum separation between the first two transitions in data representing at least three successive binary bits of said second value, and said minimum separation being greater than the maximum separation between succeeding transitions in data representing at least three successive binary bits of said first value.*

2. The method of claim 1 wherein said step of measuring the separation between succeeding transitions comprises providing a predetermined bit of predetermined duration representative of a transition; and loading said predetermined bits into a multi-stage shift register in synchronism with timing pulses; whereby the particular stages of said shift register which are occupied by said predetermined bits provide a measurement of the separation between succeeding transitions.

3. The method of claim 2 wherein the storage capacity of said shift register is sufficient to accomodate concurrently the predetermined bits representing at least three succeeding transitions in data representing successive binary bits of said first value.

4. The method of claim 3 wherein the storage capacity of said shift register is sufficient to accommodate concurrently the predetermined bits representing at least three succeeding transitions in data representing successive binary bits of said second value.

5. The method of claim 2 wherein said step of determining if the separation between at least the first two succeeding transitions is less than or greater than a predetermined amount comprises comparing the contents of preselected stages of said multi-stage shift register to each other, said preselected stages being separated from each other by amounts equal to the expected separation between transitions representing successive binary bits of said first and second values, respectively.

6. The method of claim 5 wherein said timing pulses have a period equal to one-half the interval of a bit cell and wherein said expected separation between transitions is an integral number of timing pulse periods; and wherein said step of comparing the contents of preselected stages of said multi-stage shift register includes the step of comparing the contents of stages separated from each other by an amount corresponding to a range of 4 to 7 timing pulse periods to determine if said predetermined bits are present in said compared stages.

7. The method of claim 6 wherein said step of producing successive binary bits of a first value when said separation is determined to be less than said predetermined amount includes the step of generating a binary bit of said first value when said predetermined bit is present concurrently in said compared stages.

8. A method of decoding digital data having transitions therein, wherein the separation between succeeding transitions represents successive binary bits of a first value if said separation is less than a predetermined amount and said separation represents successive binary bits of a second value if said separation is more than said predetermined amount, said separation being confined to a predetermined range, said method comprising the steps of comparing the separation between succeeding transitions to first and second sets of window intervals, said first set of window intervals being equal to the expected separations representing successive binary bits of said first value and said second set of window intervals being wider than said first set and being equal to the expected separations representing successive binary bits of said second value; producing binary bits of said first value when the separation between succeeding transitions is equal to an interval defined by a window interval included in said first set; and producing binary bits of said second value when the separation between succeeding transitions is equal to an interval defined by a window interval included in said second set.

9. Apparatus for decoding received digital data having transitions therein, wherein the separation between succeeding transitions represents a particular number of successive binary bits of a particular bit value, said apparatus comprising means for measuring the separation between succeeding transitions including means for providing a predetermined bit of predetermined duration representative of each transition, a source of timing pulses, and multistage shift register means for receiving said predetermined bits in synchronism with said timing pulses, whereby the particular stages of said shift register means which are occupied by said predetermined bits provide a measurement of the separation between succeeding transitions; means for determining if the separation between two succeeding transitions of said received data is less than or greater than a predetermined amount; and means for producing successive binary bits of a first value when said means for determining determines that said separation is less than said predetermined amount, and for producing successive binary bits of a second value when said means for determining determines that said separation is greater than said predetermined amount.

10. The apparatus of claim 9 wherein said determining means comprises means for comparing the contents of preselected stages of said multi-stage shift register means to each other, said preselected stages being separated from each other by amounts equal to the expected separation between transitions representing successive binary bits of said first and second values, respectively.

11. The apparatus of claim 10 wherein said timing pulses have a period equal to one-half the interval of a bit cell and wherein said expected separation between transitions is an integral number of timing pulse periods; and wherein said means for comparing compares the contents of stages separated from each other by an amount corresponding to a range of 3 to 6 timing pulse periods to determine if said predetermined bits are present in said compared stages.

12. Apparatus for decoding received digital data having transitions therein, wherein the separation between succeeding transitions represents successive binary bits of a first value if said separation is less than a predetermined amount and said separation represents successive binary bits of a second value if said separation is more than said predetermined amount, said separation being confined to a predetermined range, said apparatus comprising means for defining first and second sets of window intervals, said first set of window intervals being equal to the expected separations representing successive binary bits of said first value and said second set of window intervals being wider than said first set and being equal to the expected separations representing successive binary bits of said second value; means for comparing the separation between succeeding transitions to said first and second sets of window intervals; and means for producing binary bits of said first value when the separation between succeeding transitions is equal to an interval defined by a window interval included in said first set and for producing binary bits of said second value when the separation between succeeding transitions is equal to an interval defined by a window interval included in said second set.

* * * * *